Patented Jan. 18, 1949

2,459,488

UNITED STATES PATENT OFFICE 2,459,488

POLYVINYL ACETAL RESINS

Keith F. Beal, Berwyn, and Clifford J. B. Thor, Western Springs, Ill., assignors to The Visking Corporation, Chicago, Ill., a corporation of Virginia No Drawing. Application April 18, 1945,
Serial No. 589,084

4 Claims. (Cl. 260—73)

This invention relates to polyvinyl acetal resins, and more particularly to new and improved polyvinyl acetal resins which are thermoplastic, water-insoluble, and possess as an inherent characteristic a high degree of self-plasticity.

Polyvinyl alcohol (obtainable by the saponification or hydrolysis of such polymerized polyvinyl esters as polyvinyl acetate, polyvinyl propionate, polyvinyl butyrate, etc.) is a water-soluble substance which can be reacted with aldehydes to form resinous materials. Most of these resinous materials previously disclosed in the art are thermoplastic and differ from polyvinyl alcohol itself in that they are insoluble in water but are soluble in a wide variety of organic substances, including many water-immiscible solvents, such as aromatic hydrocarbons, chlorinated hydrocarbons and various esters. As in the case of simple alcohols, polyvinyl alcohol combines with aldehydes in the proportion of two molecular equivalents of its theoretical monomer, vinyl alcohol, to each molecular equivalent of aldehyde. Because these reaction products are analogous to the alkylidene diethers, they are usually called polyvinyl acetal resins.

United States Patent No. 2,162,679 discloses that the aforementioned resins can be softened or plasticized by means of solvents in which they are soluble. However, when so softened or plasticized, the flexibility of the composition is increased but the tensile strength and elongation are markedly decreased and the plastic composition lacks elasticity.

United States Patent No. 2,162,679 further discloses that resins resulting from the condensation of polyvinyl alcohol with butyraldehyde, propionaldehyde or valeraldehyde can be softened and plasticized with triethylene glycol di(2-ethyl butyrate) to provide a plastic composition having high flexibility, good elasticity and high ultimate strength.

United States Patent No. 2,356,479 discloses a polyvinyl acetal resin which is cold water-soluble and thermoplastic and is obtained by reacting a polyvinyl alcohol with methoxyacetaldehyde or ethoxyacetaldehyde. Such resins, though possessing high tensile strength, have relatively low elongations and therefore the use thereof is limited.

The art has been seeking a water-insoluble polyvinyl acetal resin which is so inherently self-plasticized that it can be used without the addition of plastifying agents.

Herein, the expression "self-plasticized polyvinyl acetal resin" or equivalent terminology is intended to define a polyvinyl acetal resin which, without the addition of any plasticizing agent, and when subjected in the dry state to tensile tests at room temperature (25° C.), has an elongation of at least 100% and does not fail at loads of less than 1500 lbs. per square inch.

An object of this invention is to provide a new polyvinyl acetal resin.

Another object of this invention is to provide a water-insoluble self-plasticized polyvinyl acetal resin.

An additional object of this invention is to provide a water-insoluble polyvinyl acetal resin which is permanently self-plasticized.

Other and additional objects of this invention will appear hereinafter.

The objects of the invention are accomplished, in general, by reacting a polyvinyl alcohol and an alkoxyacetaldehyde selected from the class which consists of n-propoxyacetaldehyde, n-butoxyacetaldehyde, iso-butoxyacetaldehyde, sec-butoxyacetaldehyde and diethylmethoxyacetaldehyde.

The details and manner of practicing the invention will become apparent by reference to the following specific illustrative examples, it being understood that these examples are merely illustrative embodiments of the invention and that the scope of the invention is not restricted thereto. Throughout the examples, the proportions of the ingredients are parts by weight unless otherwise specified.

*Example 1.—Polyvinyl n-propoxyacetaldehyde acetal resin*

11 parts of high viscosity polyvinyl alcohol were suspended in 335 parts of methylene chloride. To this mixture were added 42.7 parts of n-propoxyacetaldehyde azeotrope (about 33% n-propoxyacetaldehyde), 4 parts of water, and 1.2 parts concentrated hydrogen chloride (sp. gr. 1.19). While being subjected to continuous mechanical agitation, heat was applied to the reaction by means of a water bath, causing the solvent medium to reflux. A water trap inserted between the reaction flask and the reflux condenser caused the removal of both added water and water formed by the reaction. As the water was removed, the polyvinyl alcohol became swollen and gelatinous. The refluxing was continued until the system had become dehydrated and the polyvinyl n-propoxyacetal resin had dissolved completely in the methylene chloride. Sufficient N/1 alcoholic potassium hydroxide was added to neutralize any residual catalyst. The viscous solution of resin was emulsified in about 1000 parts of water and aerated until free of solvent. The precipitated resin was washed thoroughly with water and dried. Upon analysis, the product was found to be acetalized to the extent of about 86%, i. e. 86% of the available hydroxyl groups had been reacted with aldehyde.

*Example 2.—Polyvinyl n-propoxyacetaldehyde acetal resin*

97 parts of n-propoxyacetaldehyde diethylacetal were diluted with 880 parts of ethylene chloride. To this solution were added 20 parts of water and 1.2 parts of concentrated hydrogen chloride (sp. gr. 1.19), and the mixture was refluxed for 2 hours. 44 parts of high viscosity polyvinyl alcohol were then added, and the reaction carried out as described in Example 1. After recovering and drying, the resin was found to be acetalized to the extent of about 84% of the available hydroxyl groups.

*Example 3.—Polyvinyl n-butoxyacetaldehyde acetal resin*

25.3 parts of n-butoxyacetaldehyde diethylacetal were diluted with 315 parts of ethylene chloride. This solution was refluxed for 2 hours in the presence of 9 parts of water and 1.2 parts of concentrated hydrogen chloride (sp. gr. 1.19). 11 parts of high viscosity polyvinyl alcohol were then added. The reaction was carried out and the product recovered as in Example 1. The degree of acetalization was determined to be 86%.

*Example 4.—Polyvinyl iso-butoxyacetaldehyde acetal resin*

26 parts of iso-butoxyacetaldehyde diethylacetal were reacted with 11 parts of high viscosity polyvinyl alcohol as described in Example 3. The resin was acetalized to the extent of 85%.

*Example 5.—Polyvinyl sec-butoxyacetaldehyde acetal resin*

26 parts of sec-butoxyacetaldehyde diethylacetal were reacted with 11 parts of high viscosity polyvinyl alcohol as described in Example 3. The resin was acetalized to the extent of 85%.

*Example 6.—Polyvinyl diethylmethoxyacetaldehyde acetal resin*

30 parts of diethylmethoxyacetaldehyde diethylacetal were reacted with 11 parts of high viscosity polyvinyl alcohol as described in Example 3. The resin was acetalized to the extent of 86%.

In the foregoing examples, the degree of acetalization of the polyvinyl acetal resin is determined by acetylization of the uncombined hydroxyl groups by the following procedure: A sample of 0.2–0.4 gr. of the resin is heated at 100° C. for 2 hours with 5 cc. of a solution consisting of 12% by volume of acetic anhydride and 88% by volume of pyridine. The excess anhydride is determined and compared with a blank.

The high viscosity polyvinyl alcohol employed in the specific examples is a completely saponified polyvinyl acetate. It is to be understood that the invention is not restricted to such particular polyvinyl alcohol. Completely saponified polyvinyl alcohols obtained by saponification of other polyvinyl esters, such as the propionate, butyrate, etc., can also be used. The completely saponified polyvinyl ester can be of the high viscosity grade, medium viscosity grade or low viscosity grade. The viscosity grade is expressed in centipoises and is determined on a 4% aqueous solution at 20° C., using a Hoeppler viscosimeter. A polyvinyl alcohol having a viscosity of about 50 is considered of high viscosity grade. A polyvinyl alcohol having a viscosity of about 25 is considered of medium viscosity grade. A polyvinyl alcohol having a viscosity of about 5 is considered of low viscosity grade. When a completely saponified polyvinyl ester is used, the degree of acetalization thereof should be at least 80%.

Instead of using a completely saponified polyvinyl ester of high viscosity, medium viscosity or low viscosity grade, as above described, a partially saponified polyvinyl ester of high, medium or low viscosity grade can be used.

Though the examples disclose the use of polyvinyl alcohol as a starting material, this is not essential. A polyvinyl ester can be used as the starting material and it can be concomitantly de-esterified, either wholly or partially, and the de-esterified product condensed with the alkoxyacetaldehyde. In this embodiment, any of the known de-esterification agents can be used.

In general, the polyvinyl alcohol is employed in the proportion of two molecular equivalents of its theoretical monomer, vinyl alcohol, to each molecular equivalent of aldehyde. When a partially saponified polyvinyl ester, such as partially saponified polyvinyl acetate, is used, one molecular equivalent of aldehyde can be used for each two molecular equivalents of the theoretical monomeric vinyl alcohol units present in the partially saponified polyvinyl acetate. Such proportions would result in a mixed polymer containing both vinyl acetate groups and divinyl acetal groups.

In another embodiment of the invention, when a partially saponified polyvinyl ester, such as polyvinyl acetate, is utilized, it is subjected to conditions suitable for completing the saponification and simultaneously causing acetalization of the thus liberated hydroxyl groups. In such case, sufficient aldehyde is used to react with the original hydroxyl groups present and the ones freed by the completed saponification in the same ratio of one molecular equivalent of aldehyde for each two molecular equivalents of the theoretical monomeric vinyl alcohol.

Hydrochloric acid is employed, in the specific examples, as the condensation catalyst. However, it is to be understood that the invention is not restricted thereto since any of the known acetal condensation catalysts can be used.

The degree of acetalization is controlled to a considerable extent by the reaction medium employed. In the case of water, the polyvinyl alcohol is originally in solution and acetalization is considerably slowed down and eventually stopped when the degree of combination reaches the point where a water-insoluble product is formed and precipitates. The degree of combination is apparently less in the case of alcohol containing varied amounts of water than in the case of methylene chloride or ethylene chloride. Water-insoluble media, such as, for example, methylene chloride and ethylene chloride, allow the removal of water of reaction as fast as it forms in the form of an azeotropic mixture and thus helps force the reaction to completion. A medium in which the final product, i. e. the polyvinyl acetal, is soluble also favors a high degree of combination, especially if it allows for continuous dehydration of the system.

The resins of this invention are inherently colorless, tough, thermoplastic, water-insoluble, and soluble in alcohols such as methanol and butanol, in glycol ethers such as ethylene glycol monomethyl ether and ethylene glycol monobutyl ether, in chlorinated hydrocarbons such as methylene chloride and ethylene chloride, in aromatic hydrocarbons such as benzene, and in miscellaneous solvents such as dioxane and pyridine.

The resins of this invention are unique and markedly different from related resins of the prior art in that they inherently possess that property herein defined as "self-plasticized." Thus, the resins of this invention inherently possess properties which would only be obtained with related resins of the prior art by the use of plasticizers or softeners. This unique property of self-plasticity possessed by the resins of this invention depends on the aldehyde reacted with the polyvinyl alcohol and, as shown by the examples, is restricted to n-propoxyacetaldehyde, n-butoxyacetaldehyde, iso-butoxyacetaldehyde, sec-butoxyacetaldehyde, and diethylmethoxyacetaldehyde. Resins produced by acetalization of polyvinyl alcohol with aldehydes other than those to which the instant invention relates will not possess the inherent property of self-plasticity. For example, when aldehydes, such as ethoxyacetaldehyde, methoxyacetaldehyde, acetaldehyde and butyraldehyde, are utilized for the acetalization of polyvinyl alcohol, the respective resin will not possess the property of self-plasticity. That the aldehydes employed in this invention are unobvious becomes apparent from the fact that when iso-propoxyacetaldehyde is utilized for the acetalization, the property of self-plasticity will not be present in the resulting resin.

The unobviousness of the use of aldehydes employed in this invention for the production of the new resins will become more readily apparent from the following table, wherein the properties of the new resins are compared with similar properties of related resins:

The resins of this invention are capable of use in coating, film-forming or plastic compositions. They can be used as adhesives for such materials as cellulose, paper, wood, textiles, glass, metal, and the like. The adhesive can be in the form of a solution, such as is obtained by dissolving the resin in an appropriate solvent, such as methyl alcohol. When in the form of a solution, the adhesive is spread on one or both of the surfaces to be cemented together and the materials brought into intimate contact by proper application of pressure, preferably in the presence of heat. It is not essential that the adhesive be in the form of a solution. The resin may be sheeted and the sheet may be placed between the two surfaces to be cemented, adhesion being secured by the proper application of heat and pressure to the assembled materials. A sheet of the resin is admirably suitable as an interlayer for safety glass.

The resins of this invention are also oil-resistant, and thus can be used for the production of oil-resistant materials such as oil-resistant gaskets between metal surfaces.

In general, the resins of this invention can be used wherever the polyvinyl acetals of the prior art have been used.

As previously explained, the resins will produce colorless, transparent films or sheets. Through the use of appropriate dyes, pigments or fillers, transparent or opaque and appropriately colored materials can be obtained.

The instant invention provides a polyvinyl acetal resin which possesses as an inherent property a degree of plasticity which formerly could be obtained in prior art polyvinyl acetal resins only through the use of plasticizers or softeners.

Since it is obvious that various changes and modifications can be made in the above description without departing from the nature or spirit thereof, this invention is not restricted thereto except as set forth in the appended claims.

We claim:

1. A thermoplastic, water-insoluble polyvinyl acetal resin comprising the reaction product of a polyvinyl alcohol and an aldehyde selected from the class consisting of n-propoxyacetaldehyde, n-butoxyacetaldehyde, iso-butoxyacetaldehyde, sec-butoxyacetaldehyde and diethylmethoxyacetaldehyde, said resin being at least 80% acetalized and having at room temperature an elongation of at least 100% and a tensile strength

*Table*

| | Resin | Percent Acetalized | Percent Solids in Casting Dope [1] | Film Thickness (mils) [2] | | Percent Elongation | | Tensile Strength (lbs./sq. in.) | | Tear Strength (grs./mil thickness) | |
|---|---|---|---|---|---|---|---|---|---|---|---|
| | | | | Dry | Wet | Dry | Wet | Dry | Wet | Dry | Wet |
| 1 | Polyvinyl n-propoxyacetal (Examples 1;2) | 86 | 10 | 1.47 | 1.52 | 200 | 250 | 3,500 | 2,500 | 90 | 300 |
| 2 | Polyvinyl n-butoxyacetal (Example 3) [3] | 86 | 11 | 2.39 | 2.06 | 275 | 230 | 3,300 | 2,100 | 41 | 121 |
| 3 | Polyvinyl iso-butoxy-acetal (Example 4) | 85 | 10 | 1.83 | 1.78 | 195 | 152 | 2,900 | 2,600 | 64 | 111 |
| 4 | Polyvinyl sec-butoxy-acetal (Example 5) | 85 | 12 | 2.77 | 2.74 | 200 | 200 | 3,300 | 2,900 | 63 | 142 |
| 5 | Polyvinyl diethylmethoxy-acetal (Example 6) | 86 | 11½ | 1.69 | 1.55 | 330 | 150 | 2,500 | 2,500 | 145 | 147 |
| 6 | Polyvinyl iso-propoxy-acetal | 85 | 10 | 1.58 | 1.61 | 6 | 168 | 6,500 | 2,400 | 33 | 85 |
| 7 | Polyvinyl methoxyacetal | 85 | 9 | 1.38 | | 6 | | 8,800 | | 48 | |
| 8 | Polyvinyl ethoxyacetal | 85 | 9 | 1.06 | | 2 | | 5,900 | | 85 | |
| 9 | Polyvinyl butyral | 85 | 9 | 1.16 | 1.21 | 5 | 2 | 5,400 | 3,400 | 34 | 21 |
| 10 | Polyvinyl acetaldehyde acetal | 85 | 10 | 2.09 | 2.34 | 3 | 8 | 7,900 | 1,600 | 52 | 78 |

[1] Liquid medium of casting dope consisted of 28% by volume of ethylene glycol monobutyl ether and 72% by volume of dioxane.
[2] Casting dope was cast on a glass plate and after evaporation of solvent, the resulting dry film was stripped therefrom.
[3] The films of this resin were self-plasticized to the point of self-tackiness.

of at least 1500 lbs. per square inch whereby said resin is self-plasticized.

2. A thermoplastic, water-insoluble polyvinyl acetal resin comprising the reaction product of a polyvinyl alcohol and n-propoxyacetaldehyde, said resin being 84%–86% acetalized and having at room temperature an elongation of at least 100% and a tensile strength of at least 1500 lbs. per square inch whereby said resin is self-plasticized.

3. A thermoplastic, water-insoluble polyvinyl acetal resin comprising the reaction product of a polyvinyl alcohol and butoxyacetaldehyde, said resin being 85%–86% acetalized and having at room temperature an elongation of at least 100% and a tensile strength of at least 1500 lbs. per square inch whereby said resin is self-plasticized.

4. A thermoplastic, water-insoluble polyvinyl acetal resin comprising the reaction product of a polyvinyl alcohol and diethylmethoxyacetaldehyde, said resin being 85% acetalized and having at room temperature an elongation of at least 100% and a tensile strength of at least 1500 lbs. per square inch whereby said resin is self-plasticized.

KEITH F. BEAL.
CLIFFORD J. B. THOR.

REFERENCES CITED

The following references are of record in the file of this patent:

UNITED STATES PATENTS

| Number | Name | Date |
|---|---|---|
| 2,277,083 | Dorough | Mar. 24, 1942 |
| 2,356,479 | Swan | Aug. 22, 1944 |

OTHER REFERENCES

The Chemical Age, May 20, 1939, pages 373–374.